US012233028B2

(12) United States Patent
McLoughlin et al.

(10) Patent No.: US 12,233,028 B2
(45) Date of Patent: Feb. 25, 2025

(54) PISTON VALVING FOR SERIALLY CONNECTABLE DRUG MODULES OF A COMBINATORIAL DRUG DELIVERY DEVICE

(71) Applicant: Bristol-Myers Squibb Company, Princeton, NJ (US)

(72) Inventors: Martin John McLoughlin, Hillsborough, NJ (US); Stephen Lawrence Zieminski, East Brunswick, NJ (US); Mark Steven Howansky, Green Brook, NJ (US); Mariano Mumpower, Baltimore, MD (US); Melanie Marie Springer, Baltimore, MD (US); Katherine Alina Goetz, Baltimore, MD (US); Benjamin Richard Lane, Hydes, MD (US)

(73) Assignee: BRISTOL-MYERS SQUIBB COMPANY, Princeton, NJ (US)

( * ) Notice: Subject to any disclaimer, the term of this patent is extended or adjusted under 35 U.S.C. 154(b) by 472 days.

(21) Appl. No.: 17/771,198

(22) PCT Filed: Nov. 9, 2020

(86) PCT No.: PCT/US2020/059606
§ 371 (c)(1),
(2) Date: Apr. 22, 2022

(87) PCT Pub. No.: WO2021/092534
PCT Pub. Date: May 14, 2021

(65) Prior Publication Data

US 2022/0362105 A1 Nov. 17, 2022

Related U.S. Application Data

(60) Provisional application No. 62/933,045, filed on Nov. 8, 2019.

(51) Int. Cl.
*A61J 1/20* (2006.01)

(52) U.S. Cl.
CPC ............... *A61J 1/20* (2013.01); *A61J 1/2089* (2013.01); *A61J 1/2075* (2015.05)

(58) Field of Classification Search
CPC .......... A61J 1/20; A61J 1/2089; A61J 1/2096; A61J 1/2006; A61J 1/2068; A61J 1/201;
(Continued)

(56) References Cited

U.S. PATENT DOCUMENTS

| | | | | |
|---|---|---|---|---|
| 2008/0142388 A1* | 6/2008 | Whitley | ................ A61J 1/2096 | 206/438 |
| 2021/0154097 A1* | 5/2021 | McLoughlin | ..... A61M 5/14248 | |

FOREIGN PATENT DOCUMENTS

| | | |
|---|---|---|
| WO | 2002102295 A2 | 12/2002 |
| WO | 2007107406 A2 | 9/2007 |

(Continued)

OTHER PUBLICATIONS

International Search Report and Written Opinion of the International Searching Authority from PCT International Application No. PCT/US2020/059606, dated Feb. 18, 2021.

*Primary Examiner* — Susan S Su
*Assistant Examiner* — Erin A Kim
(74) *Attorney, Agent, or Firm* — Budzyn IP Law, LLC

(57) ABSTRACT

A valving arrangement is provided herein for regulating fluidics of modules usable in a combinatorial drug delivery device. The valving includes a slidable piston valve, adjustable to selectively seal an outlet path from a drug vial and a sealing port, in parallel to a vent, for selectively sealing an inlet path to the drug vial. Advantageously, the subject invention allows for applied negative pressure to adjust the valving to allow flow between serially-connected modules forming a drug delivery device.

7 Claims, 5 Drawing Sheets

(58) Field of Classification Search
CPC ...... A61J 1/2013; A61J 1/2031; A61J 1/2037; A61J 1/2075
See application file for complete search history.

(56) References Cited

FOREIGN PATENT DOCUMENTS

| | | | |
|---|---|---|---|
| WO | 2016205687 | A1 | 12/2016 |
| WO | 2019217820 | A1 | 11/2019 |
| WO | 2019217845 | A1 | 11/2019 |
| WO | 2019217864 | A1 | 11/2019 |

* cited by examiner

PISTON VALVING FOR SERIALLY CONNECTABLE DRUG MODULES OF A COMBINATORIAL DRUG DELIVERY DEVICE

CROSS-REFERENCE TO RELATED APPLICATIONS

This application is a National Stage Application under 35 U.S.C. § 371 of PCT Application No. PCT/US2020/059606, filed Nov. 9, 2020, which claims the priority benefit of U.S. Provisional Application No. 62/933,045, filed Nov. 8, 2019; the contents of which are herein incorporated by reference in their entireties.

FIELD OF THE INVENTION

The field of the present invention is the compounding and preparation of liquid drugs, especially for intra-venous infusion and direct patient infusion. More particularly the invention relates to a sealing mechanism for devices used in the preparation and compounding of combinations of two or more drugs.

BACKGROUND TO THE INVENTION

It is common practice in the administration of drugs by intravenous infusion for the drugs to be compounded within a pharmacy environment. Such drugs are typically supplied sterile in glass vials and may be supplied in solid or aqueous solution form. When supplied in solid form the drugs must be reconstituted with a sterile aqueous diluent prior to transfer to the infusion bag. The person skilled in the art will appreciate that such drug formulations will typically include several excipients for example buffers, pH modifiers, tonicity modifiers, stabilizers and so on. Typically liquid drugs for intra-venous infusion are compounded in an infusion bag in a pharmacy environment prior to transfer to the patient for infusion. Because of the need to maintain sterility of the drugs while compounding the compounding procedure is typically performed in an aseptic pharmacy hood. Typically, the pharmacist or pharmacy technician (practitioner) will prepare the drugs in accordance with an individual patient prescription.

After ensuring the hood is clear of all materials the practitioner will retrieve vials of the drugs required per the prescription from the pharmacy stocks and will verify their identity and strength. The verification process may be assisted by use of a bar code scanner or other identification technology. The practitioner will also pick from stock all of the other necessary equipment required to safely prepare the drugs for infusion including the infusion bag itself, syringes, needles, transfer sets, gloves, sharps disposal containers and so on. Once all of the necessary equipment has been assembled the practitioner will follow a protocol for the preparation of the drugs which may include the reconstitution of solid drugs by addition of diluents, the ordered withdrawal of liquid drugs from their individual vials into the IV bag via the transfer port. Typically this procedure is performed manually and involves the use of multiple needles. The risk of needle-stick injuries to the practitioner is increased by each needle required to effect the compounding of the drugs. With high potency or toxicity drugs, e.g. cytotoxic agents for chemotherapy, this presents a considerable exposure risk for the practitioner.

To eliminate some of the risks associated with manual preparation including exposure to dangerous drugs and the risk of medication errors, pharmacy compounding machines are known to the person skilled in the art which automate many of the steps involved in the preparation and compounding of drugs. Typically such machines are complex electromechanical systems which implement sophisticated precision dispensing mechanisms for the accurate reconstitution of liquid drugs. Aside from their cost, size and complexity, many of the designs for such machines described in the art draw liquid drugs from a stock reservoir and so only use a fraction of the drug in the container. Because of the need to maintain sterility, unused drug solutions must typically be discarded and so are wasted. With the very high cost of some drugs, especially biologic drugs, this waste is a significant undesirable cost. When the wasted drugs are cytotoxic agents, their disposal creates a significant environmental and safety hazard.

Recent advances in medicine, particularly in the treatment of cancer, have demonstrated that therapeutically beneficial effects can be achieved by the synergistic combination of two or more drugs.

For example, recent clinical research has demonstrated that the combination of an anti-PD-1 checkpoint inhibitor drug with a CTLA4 checkpoint inhibitor can have beneficial synergistic effects in some tumor types which can lead to better clinical outcomes than could be achieved by the individual administration of either drug alone. Typically such checkpoint inhibitor drugs are biotechnology derived monoclonal antibodies or fragments thereof of the immunoglobulin type. In some situations it may be beneficial to combine such biologic drugs with conventional chemotherapy agents such as cytotoxic drugs.

Through the utilization of serially connectable drug modules as described in applicant's co-pending applications (U.S. Provisional Patent Appl. No. 62/670,266, filed May 11, 2018; PCT Appl. No. PCT/US2019/031727, filed May 10, 2019; PCT Appl. No. PCT/US2019/031762, filed May 10, 2019; and, PCT Appl. No. PCT/US2019/031791, filed May 10, 2019) combinations of drugs can be successfully stored, shipped, and administered to patients and a manner that allows for sufficient flexibility while simultaneously minimizing product waste. These drug modules utilize common off-the-shelf vial primary containers, which during administration are pierced with a spike located inside the module, which allows the liquid drug within the vial to enter the internal fluidics of the module. It is critical that a sealing mechanism be present within the fluidics of the module that is not only able to contain the liquid drug product within the module fluidics during the spiking process, but also have the capability to open the fluidic path during use of the product to allow the drug product to flow. As this product is envisioned to be disposable, the ideal sealing mechanism must be low in cost to produce while also being extremely reliable and repeatable.

Applicant has now realized that the combinatorial principles described in U.S. Provisional Patent Application No. 62/670,266, filed on May 11, 2018, PCT Appl. No. PCT/US2019/031727, filed May 10, 2019, PCT Appl. No. PCT/US2019/031762, filed May 10, 2019, and, PCT Appl. No. PCT/US2019/031791, filed May 10, 2019, to the same assignee as herein, and which are incorporated herein by reference in their entireties, can address several of the challenges encountered in the preparation and compounding of drugs for intra-venous infusion and can provide several advantages including but not limited to simplification of pharmacy procedures, reduction in the risk of medication errors, containment and protection for the practitioner from highly potent or highly toxic agents, reduction in the risk of needle-stick injuries, reduction or elimination of drug waste, avoidance of the need for complex and expensive pharmacy compounding machines. As a consequence of these advantages in embodiments the present invention may further enable the preparation and compounding of drugs for IV infusion at locations remote from the pharmacy, and by a non-specialist practitioner, for example by a suitably trained technician or nurse at the patient's home. This possibility is enhanced by the intrinsic portability of the system described herein.

SUMMARY OF THE INVENTION

According to the present invention, for modules usable with a combinatorial drug delivery device, a movable piston seal with a bypass chamber put inline of the module's outlet fluidics provides a means of sealing the module's fluidics from atmosphere during vial piercing, while is also able to allow the fluid path to open when vacuum is applied to the outer face of the piston seal.

Two lumen pathways, inlet and outlet, within the spike that enters the vial's drug chamber, divide the module's fluidic pathway. The inlet allows the liquid drug product from the preceding connected module to enter the spiked vial, while the outlet path moves fluid from the vial to the proceeding module. A spring-loaded seal at the entrance of the inlet path is used to interface with preceding modules, this seal ensures the pathway is only opened at the time of connection with a module, therefore, once the vial is spiked, the inlet pathway is closed to the atmosphere and the vial contents cannot escape.

During vial spike, the volume of the spike entering the vial displaces some of the fluid within the vial causing slight pressurization of the vial's contents, which forces it into the spike lumens. On the inlet side this pressure is contained by a spring-loaded seal, on the outlet side the fluid enters the spike lumen and is sealed by a piston seal. Any pressure during the spiking process will slightly push the piston seal allowing the liquid chamber to increase volumetrically, thus reducing the pressure from spiking. On the opposite side of the piston seal is the outlet to the proceeding module's inlet. A small bypass is cut into the module body next to the piston seal connecting the outlet chamber to the outlet fitting. When a source of vacuum is applied to the outlet fitting this will cause the piston to move, exposing the bypass port to the vial's fluidic pathway thus opening up a path way for fluid to travel from the vial to the outlet fitting.

DETAILED DESCRIPTION

Figure 1:
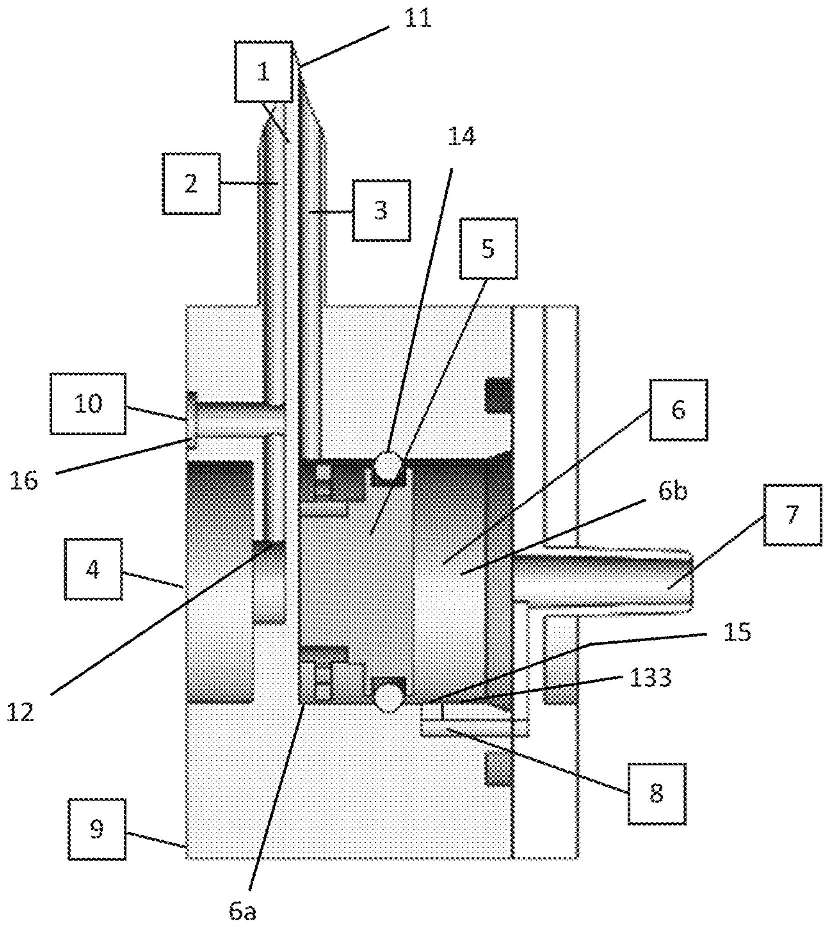
FIG. 1 shows a piston valve in a closed position in accordance with the subject invention.
Figure 4:
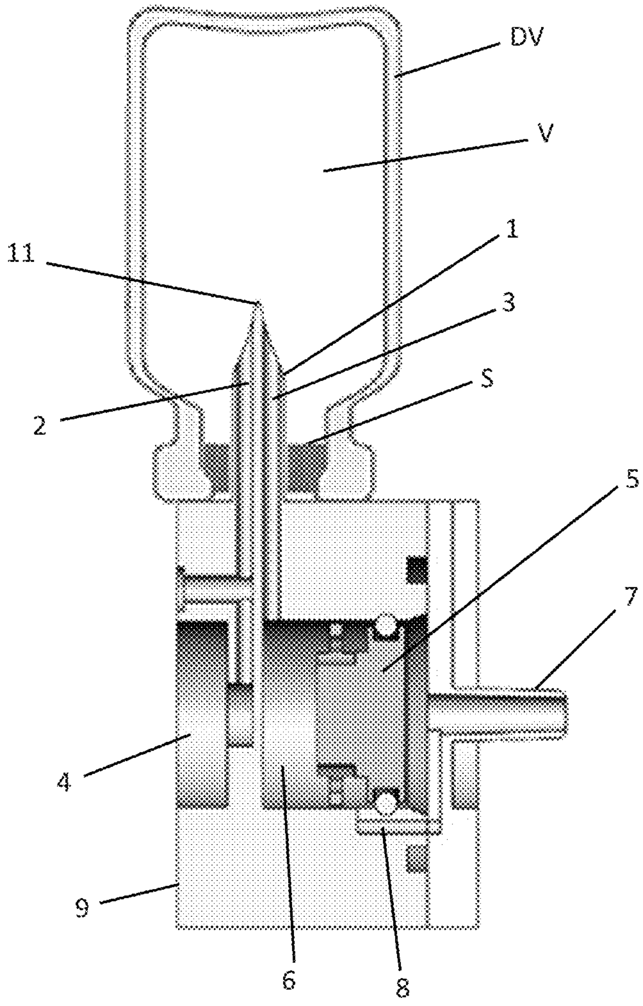
FIG. 4 shows a drug vial coupled to valving in accordance with the subject invention.

The subject invention is particularly well-suited for use with serially-connected drug modules, particularly in forming fluid paths therebetween. The subject invention is shown in a context of a single module 9, but it is understood that the subject invention operates with a plurality of similarly formed modules 9, serially connected. As depicted in FIGS. 1 and 4, each of the modules 9 includes valving having a vial spike 1 used to pierce a vial septum S extending into the interior volume V of a liquid filled drug vial DV. A free, distal end 11 of the vial spike 1 may be sharpened to facilitate piercing of the vial septum S. The vial spike 1 must be provided with sufficient length to fully pierce the septum S in accessing the interior volume V.

The vial spike 1 includes two lumens dividing the module fluidics into separate circuits, an inlet path 2, and an outlet path 3. With the vial spike 1 piercing the septum S, both the inlet path 2 and the outlet path 3 are open at the free end 11 of the vial spike 1 and in communication with the interior volume V of the drug vial DV. The inlet path 2 extends from the interior volume V of the drug vial DV to an inlet opening 12 which is selectively sealed by spring-biased sealing port 4. A vent 10 exists on the inlet path 2, preferably between the free end 11 and the inlet opening 12, to allow air into the drug vial DV, as needed, to displace fluid during transfer. Preferably, the vent 10 is a one-way vent which is normally closed and allows for gas flow into the inlet path 2. The outlet path 3 extends from the interior volume V of the drug vial DV down to outlet chamber 6. A piston valve 5 is slidably seated inside the outlet chamber 6 creating a seal against the chamber inner wall 13. The piston valve 5 may include a radial seal 14 in sealing contact with the wall 13 to define the seal whilst allowing the piston valve 5 to slide within the outlet chamber 6.

The piston valve 5 forms a seal in the outlet chamber 6 to define first and second chamber portions **6*a*, 6*b*, which are adjustable in size with movement of the piston valve 5 within the outlet chamber 6, with the seal therebetween being maintained. The outlet path 3 is in communication with the first chamber portion 6*a*. An outlet fitting 7 is provided which is in communication with the outlet chamber 6, particularly, the second outlet chamber 6*b***.

In an initial state, as shown in FIG. 1, the piston valve 5 is placed in a first position at the medial end of the outlet chamber 6 preventing fluid entering from the outlet lumen 3 from accessing the outlet fitting 7. A bypass passageway 8 connects the outlet chamber 6 to the outlet fitting 7. In particular, the bypass passageway 8 terminates at an opening 15 in the wall 13 of the outlet chamber 6. With the piston valve 5 in the first position, the first chamber portion **6*a* is sealed from the bypass passageway 8**.

Figure 2:
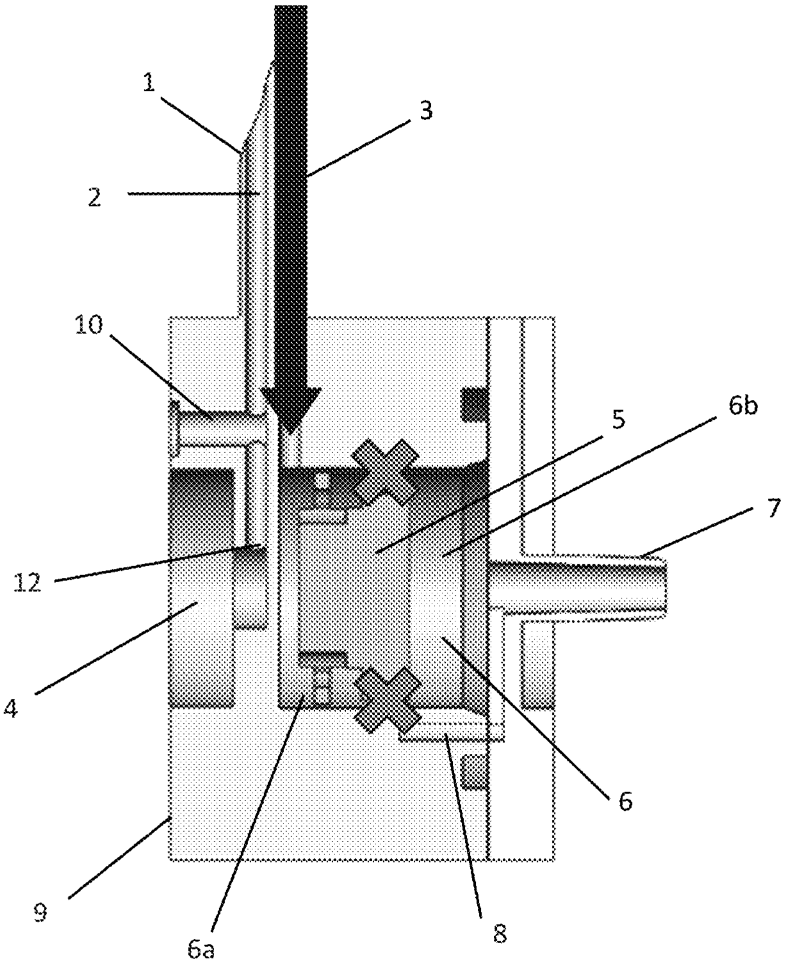
FIG. 2 shows a piston valve relieving vial positive pressure in accordance with the subject invention.

With this arrangement (the piston valve 5 being in the first position), and, as shown in FIG. 2, pressurized fluid forced from the drug vial DV, as a result of vial spike 1 spiking the septum S, will be contained in the inlet pathway 2 by the spring-biased sealing port 4, while any entering the outlet pathway 3 will be contained within the first chamber portion **6*a* behind the piston valve 5. As shown in FIG. 2, pressure in the fluid may move the piston valve 5** slightly; this movement in position will equilibrate the pressure within the drug vial DV and fluid path to a negligible amount.

Figure 3:
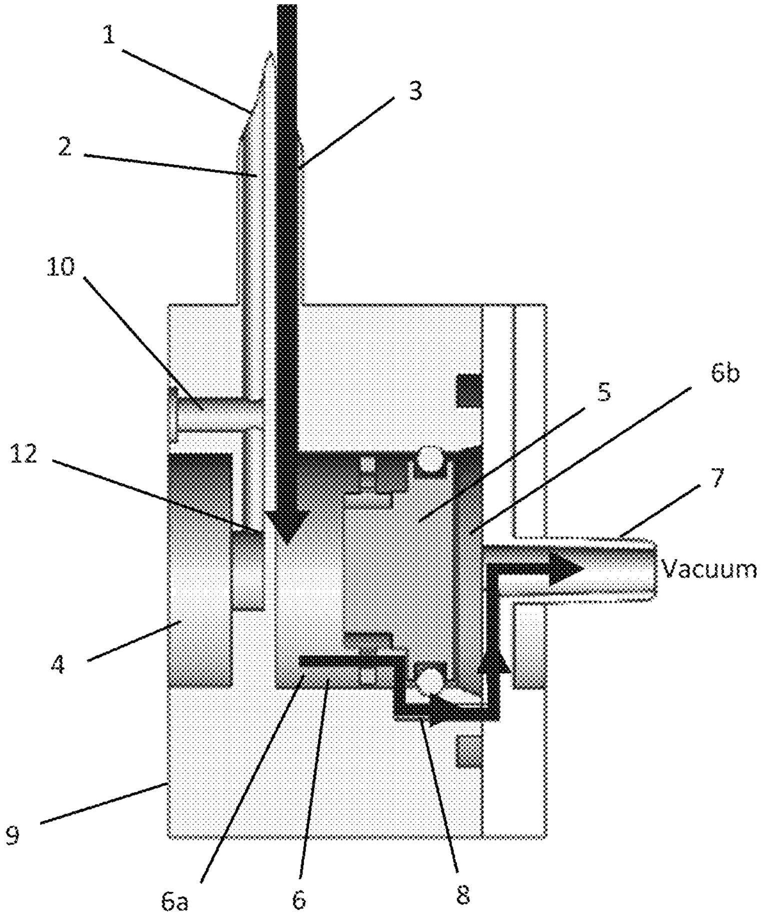
FIG. 3 shows a piston valve in an open position in accordance with the subject invention.

As shown in FIG. 3, at the time of fluid transfer, a source of negative pressure, e.g., a vacuum, will be provided to the outlet fitting 7, thereby evacuating air from the bypass passageway 8 and the outlet chamber 6, particularly, the second chamber portion **6*b*. This will generate a pressure differential across the piston valve 5 which will cause the piston valve 5 to slide along the outlet chamber 6 towards the outlet fitting 7. This results in an increase in volume of the first chamber portion 6*a***. Eventually, as the piston valve 5 continues moving it will pass over the bypass passageway 8, thereby allowing the first chamber portion 6*a*, along with the outlet path 3, to come into communication with the bypass passageway 8. As shown in FIG. 3, with the bypass passageway 8 carrying vacuum, fluid will then be able to move from the vial, through the outlet pathway 3, through the bypass passageway 8 circumventing the piston valve 5, and out through the outlet fitting 7.

Figure 5:
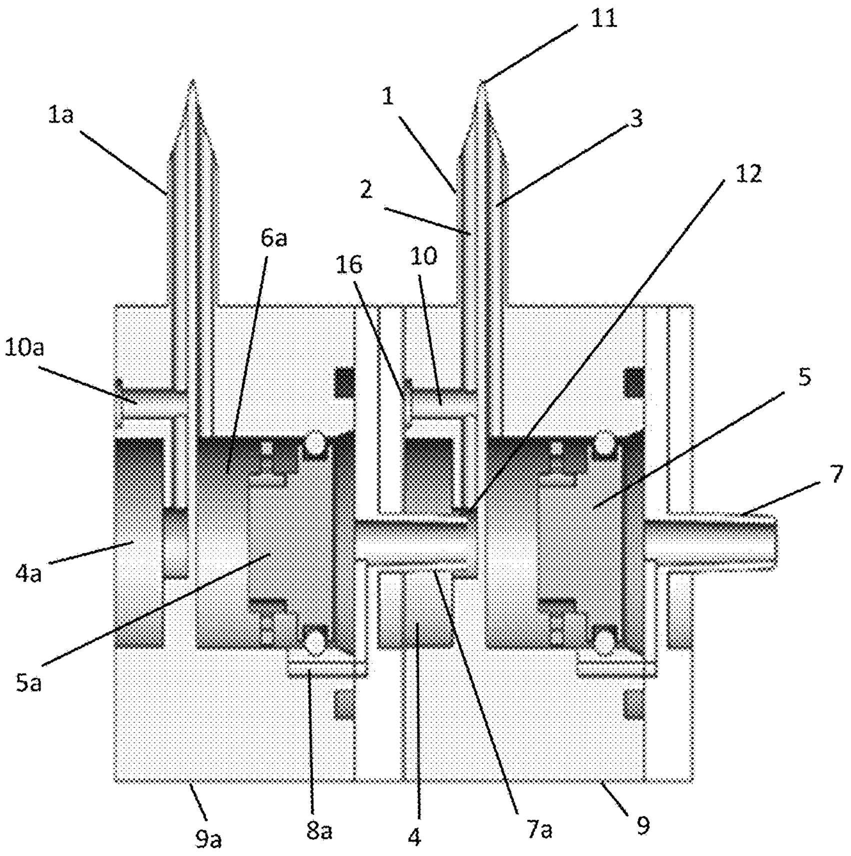
FIG. 5 shows piston valves connected in series in accordance with the subject invention; and, FIG. 6 shows a fluid pathway for piston valves connected in series in accordance with the subject invention.
Figure 6:
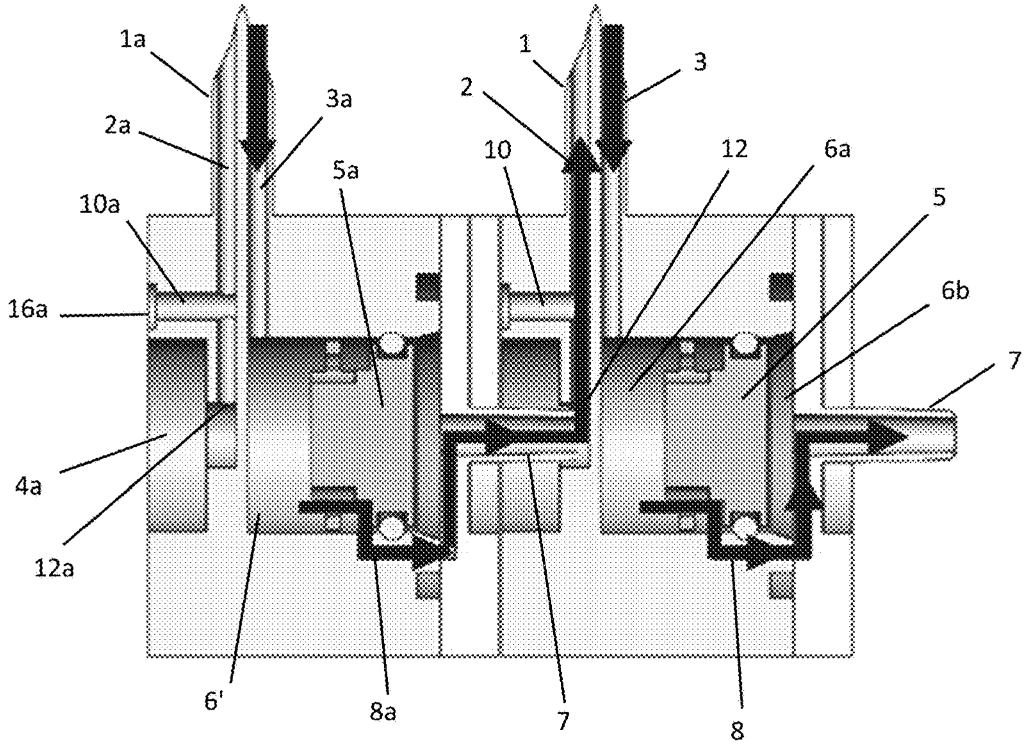

As shown in FIGS. 5 and 6, a plurality of the modules 9 may be coupled in series with the outlet fitting 7*a* of a secondary module 9*a* breaching the sealing port 4 of an adjacent module 9 such that the outlet fitting 7*a* is in communication with the inlet opening 12 thereof. The secondary module 9*a* is formed similar to the module 9 with like parts being similarly numbered, but additionally designated with the letter "a" (except for the outlet chamber of the secondary module which is designated as 6'). The coupled arrangement allows for a fluid path to be defined from a drug vial DV coupled to vial spike 1*a* of the secondary module 9*a* to the outlet fitting 7 of the module 9, through a drug vial DV coupled to vial spike 1, as shown schematically in FIG. 6. This fluid pathway is achieved with sliding movement of piston valve 5*a*, resulting from negative pressure being applied to the outlet fitting 7*a*, via the outlet path 3 and the inlet path 2 of the module 9. In similar manner to that described above, flow bypasses the piston valve 5*a* with the bypass passageway 8*a*, upon sufficient sliding displacement of the piston valve 5*a*. This arrangement allows for a series of modules 9 to be coupled, with the respective drug vials DV being in-line to define a single flow path, acted upon by a single source of negative pressure.

It is also noted that the vent 10 may be located to terminate at a vent opening 16 located to be exposed to open atmosphere. Preferably, the vent opening 16 is located on a common wall as the sealing port 4, such that an adjacent coupled module 9*a* covers the vent opening 16. This obstruction restricts venting in the module 9 thereby maximizing negative pressure applied to the adjacent coupled module 9*a*. Obstructed venting may continue through a series of coupled modules, with the ultimate module 9 (e.g., module 9*a*) having the vent opening 16 be exposed, thereby, providing venting for the whole series.

What is claimed is:

1. A module for use in a combinatorial drug delivery device, the module formed to accommodate a drug vial with a septum, the module comprising:
- a vial spike formed to pierce the septum of the drug vial with a free end of the vial spike being located interiorly of the septum, the vial spike including an inlet path open at the free end and extending along the vial spike to an inlet opening, and an outlet path open at the free end and extending along the vial spike to an outlet chamber, the outlet path being separate from the inlet path;
- a sealing port selectively sealing the inlet opening;
- a vent in communication with the inlet path between the inlet opening and the free end;
- a slidable piston valve located in the outlet chamber, the piston valve forming a seal in the outlet chamber to define first and second chamber portions, the outlet path being in communication with the first chamber portion;
- an outlet fitting in communication with the second chamber portion; and,
- a bypass passageway extending between the outlet fitting and an opening in the outlet chamber,
- wherein, in an initial state, the piston valve is located in a first position where the first chamber portion is sealed from the bypass passageway, and,
- wherein, with negative pressure introduced through the outlet fitting, the piston valve is caused to move to a second position where the first chamber portion is in communication with the bypass passageway.

2. A module as in claim 1, wherein the vent is a one-way vent which is normally closed and allows for gas flow into the inlet path.

3. A module as in claim 1, wherein the piston valve includes a radial seal in sealing contact with a wall of the outlet chamber.

4. A combination comprising:
- a first module including:
  - a first vial spike with a first free end, the first vial spike including a first inlet path open at the first free end and extending along the first vial spike to a first inlet opening, and a first outlet path open at the first free end and extending along the first vial spike to a first outlet chamber, the first outlet path being separate from the first inlet path;
  - a first sealing port selectively sealing the first inlet opening;
  - a first vent in communication with the first inlet path between the first inlet opening and the first free end;
  - a slidable first piston valve located in the first outlet chamber, the first piston valve forming a seal in the first outlet chamber to define first and second primary chamber portions, the first outlet path being in communication with the first primary chamber portion;
  - a first outlet fitting in communication with the second primary chamber portion; and,
  - a first bypass passageway extending between the first outlet fitting and a first opening in the first outlet chamber,
- a second module including:
  - a second vial spike with a second free end, the second vial spike including a second inlet path open at the second free end and extending along the second vial spike to a second inlet opening, and a second outlet path open at the second free end and extending along the second vial spike to a second outlet chamber, the second outlet path being separate from the second inlet path;
  - a second sealing port selectively sealing the second inlet opening;
  - a second vent in communication with the second inlet path between the second inlet opening and the second free end;
  - a slidable second piston valve located in the second outlet chamber, the second piston valve forming a seal in the second outlet chamber to define first and second secondary chamber portions, the second outlet path being in communication with the first secondary chamber portion;
  - a second outlet fitting in communication with the second secondary chamber portion; and,
  - a second bypass passageway extending between the second outlet fitting and a second opening in the second outlet chamber,
- wherein, the second module is coupled to the first module with the second outlet fitting extending through the first seal port to be in communication with the first inlet opening, wherein, in an initial state, the first piston valve is located in a first position where the first primary chamber portion is sealed from the first bypass passageway, wherein, with negative pressure introduced through the first outlet fitting, the first piston valve is caused to move to a second position where the first primary chamber portion is in communication with the first bypass passageway, and, wherein, with the first piston valve in the second position, the negative pressure is introduced to the second outlet fitting via the first outlet path and the first inlet path.

5. A combination as in claim 4, wherein the first vent is covered by the second module with the second module coupled to the first module.

6. A combination as in claim 4, wherein the second vent is exposed with the second sealing port sealing the second inlet opening with the second module coupled to the first module.

7. A combination as in claim 4, wherein, with the negative pressure introduced through the second outlet fitting, the second piston valve is caused to move within the second outlet chamber to cause the first secondary chamber portion to come into communication with the second bypass passageway.

* * * * *